United States Patent
Watanabe et al.

[15] 3,657,032
[45] Apr. 18, 1972

[54] METHOD FOR CONTINUOUSLY MANUFACTURING REINFORCED PLASTIC BOARD

[72] Inventors: Shigeo Watanabe; Tomomi Yamaguchi, both of Fukushima-shi, Japan

[73] Assignee: Nitto Boseki Co. Ltd., Fukushima-shi, Japan

[22] Filed: Nov. 8, 1968

[21] Appl. No.: 774,279

[30] Foreign Application Priority Data

Nov. 8, 1967 Japan..................................42/71442

[52] U.S. Cl..............................156/62.4, 156/179, 156/276, 161/59
[51] Int. Cl.........................................................B32b 17/04
[58] Field of Search..................156/178, 179, 181, 300, 286, 156/62.4, 276; 161/59; 264/288; 56/341

[56] References Cited

UNITED STATES PATENTS

| 3,022,622 | 2/1962 | Nolt | 56/341 |
|---|---|---|---|
| 2,771,387 | 11/1956 | Kleist et al. | 156/179 |
| 2,927,623 | 3/1960 | Huisman et al. | 156/179 |
| 3,163,689 | 12/1964 | Ives | 156/179 |
| 3,449,187 | 6/1969 | Bobkowicz | 156/178 |

*Primary Examiner*—Carl D. Quarforth
*Assistant Examiner*—E. E. Lehmann
*Attorney*—Sughrue, Rothwell, Mion, Zinn & Macpeak

[57] ABSTRACT

Method for continuously manufacturing reinforced plastic boards and by a liquid resin impregnation step which comprises successively depositing a layer of a heat-hardenable synthetic resin and a layer of fibrous material onto a lower inert film, and maintaining the thus formed composite in intimate contact over an arcuate path by depressing the composite with a plurality of arcuately deposed filamentary members which contact the composite, depositing an upper inert film onto the composite, compressing the upper and the lower film-contained unit, whereby excess resin solution is intimately saturated into the fibrous mat. The filamentary members are removed from the compressed composite by the passage of the reinforced plastic board from the processing area. Apparatus for continuously manufacturing reinforced plastic board is also disclosed in the specification.

5 Claims, 1 Drawing Figure

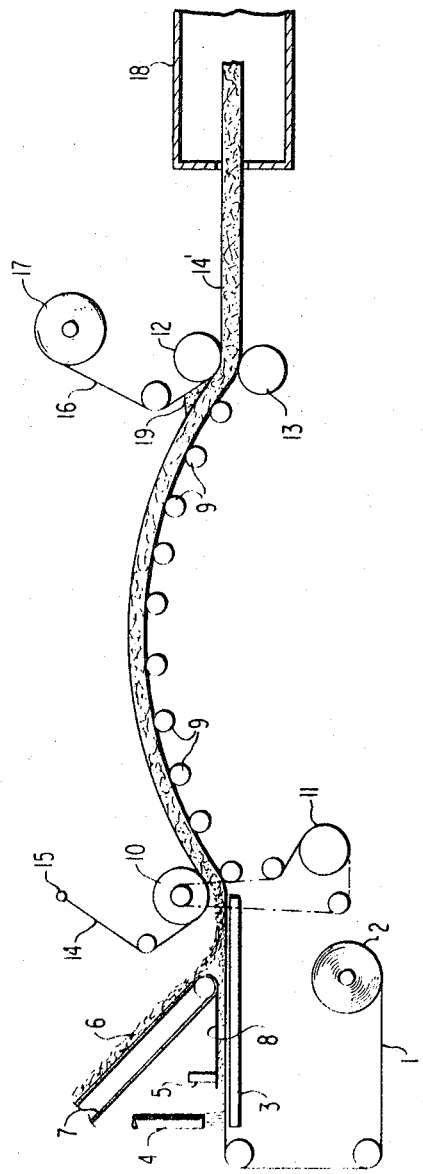

METHOD FOR CONTINUOUSLY MANUFACTURING REINFORCED PLASTIC BOARD

BACKGROUND OF THE INVENTION

1. Field of the Invention

The present invention is related to an improvement in a resin solution-impregnation process, employed in the continuous manufacture of a reinforced plastic board, the process being effected by impregnating a fiber mat with a solution of a synthetic resin, and curing the same.

2. Description of the Prior Art

In fiber-reinforced plastic boards, heat-setting resins, including polyester-epoxy resins as the synthetic resin, and reinforcing fibers, such as glass fibers, are often combined. The present invention is directed mainly to these combinations. However, the present invention can also be applied to instances where other types of synthetic resins and reinforcement fibers are employed.

Methods for conducting the continuous manufacture of reinforced plastic boards of this kind usually comprises the steps of impregnating a fiber mat with a solution of resin on a film, made of a material such as cellophane and synthetic resin. An inert film is placed on the impregnated mat, the resultant assembly is passed through squeezing rollers to form the assembly into a flat board while squeezing out surplus liquid and removing bubbles therefrom, and the board is then subjected to a heat-setting operation.

It is a matter of importance in such an operation to insure complete saturation with the resin solution, without disarranging distribution of the fibers of the fiber mat. In addition, air located in the spaces between fibers and in the interior portions of the mat must be completely exhausted therefrom. When a "chopped strand" mat of glass fibers is used, the failure of the resin to permeate into the spaces between the fibers located inside each strand will especially lead to the occurrence of devitrification and internal patches. For this reason, there have been various proposals made with respect to procedures for applying a resin solution, impregnation and squeezing techniques, and so forth, to solve the above problem.

The following problems have been encountered, in general: when a viscous solution of resin was poured onto a fiber mat which was a mere scattered accumulation of fibers having no union therebetween, derangement of the distributed fibers occurred; also, when the resin-impregnated mat was fed to the squeezing rollers, the flow of the solution squeezed out the resin caused displacement of fibers. For these reasons, the prior art proposed the following methods. One method comprised the steps of first forming a uniform layer of a resin solution on a lower inert film, thereafter placing a fiber mat on the upper face thereof and then applying a pressure thereto to thereby eliminate bubbles and effect impregnation. A second proposal comprised the steps of inserting additional parallel filaments along the upper face of a fiber mat already impregnated with a resin solution to squeeze out the surplus liquid and to remove any bubbles while simultaneously preventing the displacement of fibers. These methods, however, were found to be insufficient to insure retention of the distributed fibers, and also did not allow complete evacuation of the bubbles.

Methods which are now practiced effectively on an industrial scale are represented by, for example, the method which is described in U.S. Pat. No. 2,927,623. This method comprises the steps of: forming a uniform layer of a heat-setting resin solution on the upper face of lower inert film which is continuously transferred; placing on the surface of the layer a single fiber mat of chopped strands of glass fibers; introducing along the upper face of said layer while under tension in accordance with the advancement of said mat, a number of parallel filaments along an upwardly convexing path; forcing said filaments together with the fibers into the layer of the resin solution; supplying in a laminar fashion, an upper inert film onto the resulting face while passing the resulting laminar assembly through squeezing rollers to evacuate bubbles therefrom and to shape the assembly; and then subjecting the shaped material to heat-setting. This method was ideal because saturation with the resin solution could be accomplished without any derangement of the fibers. However, the introduced parallel filaments remained in the product, and causes a problem from the aspect of quality, including the external appearance and transparency of the product. In addition, the residual filaments did not in any way contribute to the reinforcement of the product. Nevertheless, the inclusion of filaments was considered to be unavoidable from the inherent requirements of this manufacturing process.

The present invention has succeeded, when a method such as that of U.S. Pat. No. 2,927,623 is practiced, in avoiding the retention of filaments in the laminated product while preserving all beneficial effects of this resin-impregnation method. The present invention is so conducted that the forcing of a fiber mat into the layer of the resin solution is performed only during the step of impregnation with the resin solution. In order to prevent the displacement of fibers which, may arise at the time of squeezing the liquid, there have been provided filament threads disposed in parallel and extending in a stationary manner from a curved path along the face of the fiber mat passing through the squeezing rollers, the filament threads being maintained a proper distance from the nipping point of the squeeze rollers.

SUMMARY OF THE INVENTION

The present invention provides an improved method for continuously manufacturing reinforced plastic boards.

The method basically comprises depositing a layer of a heat-hardenable synthetic resin onto a travelling lower inert film, and then depositing a layer of fibrous material onto the heat-hardenable synthetic resin. The thus formed composite is maintained in intimate contact over an arcuate path by a plurality of arcuately deposed filamentary members which depress the composite over the arcuate path. Prior to a compression step, where an excess resin is removed from the fibrous material, an upper inert film is applied onto the composite. The upper and lower inert film-contained unit is then compressed, such as by squeezing rollers. The filamentary members are removed from the compressed upper and lower inert film-contained unit by the forward motion of the composite along the process treatment path. A lubricating effect of the resin solution and the spacing of the filamentary materials prevents any displacement of the fibers.

The composite is then, preferably, cured.

It is an object of the present invention to provide an improved process for manufacturing reinforced plastic board.

It is a further object of the present invention to provide apparatus useful for manufacturing a reinforced plastic board.

It is yet another object of the present invention to provide a method for manufacturing plastic board wherein substantially no derangement of fibers occurs and the reinforced plastic board does not contain extraneous filamentary materials therein.

BRIEF DESCRIPTION OF THE DRAWING

The drawing is a side elevational view of an apparatus for use in the process of the present invention.

DESCRIPTION OF THE PREFERRED EMBODIMENTS

In the drawing, numeral 1 represents a lower inert film, such as cellophane, which is continuously fed from a reel 2. Numeral 3 represents a flat-faced table. Numeral 4 represents a pipe for supplying a solution of a heat-setting synthetic resin such as a polyester resin containing a curing catalyst to the inert film. There is provided an arrangement such that the continuous supply of this solution is effected at a predetermined rate by means of a pump. Numeral 5 represents a doctor for uniformly distributing the resin solution, to a predetermined width, onto the face of the lower inert film lying on the flat-faced table. Numeral 6 represents a fiber mat consisting of a uniformly distributed material, such as chopped strands of glass fibers, this fiber mat being adapted to be disposed and continuously supplied onto a conveyor 7, a layer of a resin solution preferably being carried by conveyor 7. Numeral 9 represents, in general, a number of idle rollers arranged so as to effect the transfer of the lower inert film 1 along a curved path while in contact with the rollers. Numeral 10 represents a roller provided at the forward end of the curved path for depressing the fiber mat 6, said roller being rotated by being driven from a motor 11 in agreement with the velocity of the rollers provided adjacent the rear end of the curved path and adjusted so as to have a nipping clearance to produce a board of the required thickness. Numeral 14 represents, in general, monofilament threads, such as synthetic fibers or steel wires, which have flat faces and which, like nylon for example, are not affected by the synthetic resin solution. Said threads are fixed, at one end, to a retainer shaft 15, and passed around the lower periphery of said depressing roller 10 and brought into contact with the upper face of the fiber mat lying on the curved path. The threads are thereafter passed through the nipping clearance formed by the squeezing rollers 12 and 13. The other ends of the threads are located at a distance of about 30 – 50 cm. from the nipping point of the squeezing rollers 12 and 13 in the direction of the advancement of said fiber mat. The threads 14 are disposed, in a large number, so as to form parallel rows and so as to be distributed uniformly over the width of the fiber mat. Normally, these individual parallel threads are spaced at about 10 mm. – 40 mm. intervals. An interval less than 10 mm. is undesirable because of the occurrence of fiber derangement due to friction between the fibers and the threads. Numeral 16 represents an upper inert film which is continuously fed from a reel 17 and is advanced, together with the lower inert film 1 and the resin-impregnated mat 6, through the nipping clearance formed by the squeezing rollers 12 and 13. Numeral 18 represents a heat-treatment furnace for curing the resin by passing the resin-impregnated laminar article therethrough, by means of a clip-tenter, or by any other appropriate transfer means. Numeral 19 represents surplus resin solution squeezed out by the squeezing rollers 12 and 13, which is adapted to be returned to a resin solution tank to be recycled after being removed, such as by a vacuum, and the like.

With this arrangement, the mono-filament threads 14 are retained in the state of being sandwiched between the lower face of the upper inert film 16 and the upper face of the resin-impregnated fiber mat for a distance beginning with the depressing roller 10 (the face of the resin-impregnated mat lying on the curved path) and ending at a site about 30 – 50 cm. from the nipping point of the squeezing rollers 12 and 13 in the direction of the advancement of the mat so that the threads are subjected to an intensive pulling force resulting from the movements of these members, giving rise to a resultant depression of the fiber mat 6 towards the face of the lower inert film 1 while the mat is being passed over the upwardly convexed path. The resin solution thereby easily oozes out onto the upper face of the fiber mat 6, this effect initially beginning at the site of depressing roller 10. The resin solution which has been forced out exerts a lubricating action on the mono-filament threads 14 which are brough into slidable contact with the upper face of the mat, so that they exhibit the function of effectively depressing the mat throughout the period in which the mat passes over the curved path, hardly any displacement of the fibers of the mat resulting. Thus, there will be given a sufficient time for the resin solution to permeate into and saturate the spaces between the fibers while the upper face of the fiber mat is in its open state.

While the fiber mat 6 is being progressively covered under the upper inert film 16 by the squeezing rollers 12 and 13, the surplus resin solution 19 which is contained in the mat will be forced out of the mat, together with the small amount of air still remaining therein, and this solution flows on the upper face of the mat. However, the fibers of the mat are still kept under the pressure of the mono-filament threads 14, and are not displaced. The fiber mat which has passed the nipping point of the squeezing rollers 12 and 13 is not completely saturated with the resin and travels in its state of being in contact, under pressure, with the upper and the lower inert films, and it thereby imparts an intensive sliding frictional force to the ends 14' of the stationary mono-filament threads, effectively preventing the tendency of the mono-filament threads 14 lying on the curved path of being displaced in the direction of the width of the mat. The length of the end portions 14' of the threads from the nipping point of the squeezing rollers 12 and 13 is generally about 30 – 50 cm. to maintain the threads in their stabilized parallel state, and this length is most preferable, although the exact length could be varied by one skilled in the art in view of the present specification. A length less than 30 cm. may be applicable, but it is not very effective for preventing displacement, and providing sufficient tension. While a length greater than 50 cm. may also be applicable, it provides no increased effect, and there may occur troubles with the end portions of the threads being subjected to some harm from the heat-treatment furnace located in the subsequent stage so that the resin becomes fixed on the end portions of the threads and causes derangement of the layer of the fibers. According to the manufacturing method of the present invention, there can be accomplished the impregnation and saturation of a fiber mat with a resin solution almost ideally, without deranging the layer of fibers so that it is possible to obtain a continuous fiber-reinforced plastic board.

Furthermore, in the above explanation, the invention was explained for the case of employing a single resin liquid impregnating means and a single heat-treatment furnace, but it will be understood that the invention can be applied to a mass production system by positioning a plurality of resin liquid impregnating means in a vertical direction with a suitable interval with respect to each other, and introducing a plurality of resin liquid-impregnated laminates from these means to a single heat-treatment furnace.

What is claimed is:

1. A method for continuously manufacturing reinforced plastic board utilizing resin impregnating solutions which comprises:
   a. successively depositing a layer of a heat-hardenable synthetic resin and a layer of fibrous material onto a lower inert film;
   b. maintaining said composite formed in the initial process step in intimate contact over an arcuate path by depressing the composite with a positively driven depressing roller and maintaining said composite in a depressed state with a plurality of arcuately deposed filamentary members, which contact the composite, said filamentary members being spaced in a transverse distance from about 10 to about 40mm., apart;
   c. depositing an upper inert film onto said composite;
   d. compressing the upper and lower inert film-contained unit, whereby an excess resin solution is intimately saturated into said fibrous material; and
   e. removing said filamentary members from the interior of said upper and lower inert film-contained composite, said plurality of arcuately deposed filamentary members exerting a force against the composite sufficient to urge the resin solution out and onto the upper surface of the fiber mat, thus imparting a lubricating action between said filamentary members and said fiber mat.

2. A method as in claim 1 wherein said filamentary members are fixed at one end thereof, and are removed from said upper and lower inert film-contained composite by the forward travel of said composite, the remaining end of said filamentary members being free.

3. A process as in claim 2 wherein said compression is performed by passing said upper and lower inert film-contained composite through squeezing rollers.

4. A method as in claim 3 wherein the free end of said filamentary members extends from about 30 to about 50 cm. beyond said squeezing rollers.

5. A method as in claim 1 which comprises the additional step of curing said upper and lower inert film-contained composite.

* * * * *